United States Patent
Ohno et al.

(10) Patent No.: US 12,422,409 B2
(45) Date of Patent: Sep. 23, 2025

(54) ULTRASOUND IMAGE APPARATUS AND LIQUID INFILTRATION PREVENTION METHOD INTO BONDED WAFER

(71) Applicant: Hitachi Power Solutions Co., Ltd., Ibaraki (JP)

(72) Inventors: Shigeru Ohno, Hitachi (JP); Kazuhiro Noda, Tokyo (JP); Kotaro Kikukawa, Hitachi (JP); Natsuki Sugaya, Hitachi (JP)

(73) Assignee: Hitachi Power Solutions Co., Ltd., Ibaraki (JP)

( * ) Notice: Subject to any disclaimer, the term of this patent is extended or adjusted under 35 U.S.C. 154(b) by 321 days.

(21) Appl. No.: 18/198,221

(22) Filed: May 16, 2023

(65) Prior Publication Data

US 2023/0375507 A1 Nov. 23, 2023

(30) Foreign Application Priority Data

May 19, 2022 (JP) .................................. 2022-082383

(51) Int. Cl.
*G01N 29/06* (2006.01)
*G01N 29/265* (2006.01)

(52) U.S. Cl.
CPC ....... *G01N 29/0654* (2013.01); *G01N 29/265* (2013.01); *G01N 2291/2697* (2013.01)

(58) Field of Classification Search
CPC ............. G01N 29/0654; G01N 29/265; G01N 2291/2697; G01N 29/04; G01N 29/44; H01L 21/66; B06B 1/06
See application file for complete search history.

(56) References Cited

U.S. PATENT DOCUMENTS

| | | | | |
|---|---|---|---|---|
| 6,583,071 B1 * | 6/2003 | Weidman | ............ | C23C 16/4486 438/782 |
| 2003/0015218 A1 * | 1/2003 | Bran | ........................ | B08B 3/12 134/1.3 |
| 2005/0257617 A1 * | 11/2005 | Busch | ............... | H01L 21/67288 73/584 |
| 2009/0098710 A1 * | 4/2009 | Yamazaki | .............. | H10D 86/40 438/798 |
| 2010/0204583 A1 * | 8/2010 | Rhim | ....................... | A61B 8/00 600/459 |
| 2017/0176397 A1 | 6/2017 | Oono et al. | | |

FOREIGN PATENT DOCUMENTS

JP  2015-148493 A  5/2015

\* cited by examiner

*Primary Examiner* — Daniel L Murphy
*Assistant Examiner* — Amie M Ndure
(74) *Attorney, Agent, or Firm* — Mattingly & Malur, PC

(57) ABSTRACT

An ultrasound image apparatus irradiates a bonded wafer in which two or more wafers are bonded with an ultrasonic wave to generate an image of the bonded surface between the wafers. An ultrasonic probe irradiates the bonded wafer with the ultrasonic wave on a lower side of the bonded wafer. A liquid ejection unit moves together with the ultrasonic probe while continuously ejecting a liquid toward a bottom surface such that a liquid film in contact with the bottom surface is formed between the liquid ejection unit and the bottom surface of the bonded wafer. Also, a gas ejection device ejects gas for pushing down the liquid toward an outer peripheral end portion of the bonded wafer so that the liquid ejected from the liquid ejection unit does not infiltrate into the bonded surface from the outer peripheral end portion of the bonded wafer.

7 Claims, 9 Drawing Sheets

ULTRASOUND IMAGE APPARATUS AND LIQUID INFILTRATION PREVENTION METHOD INTO BONDED WAFER

CROSS-REFERENCE TO RELATED APPLICATION

The present application claims priority from Japanese application JP2022-082383, filed on May 19, 2022, the content of which is hereby incorporated by reference into this application.

BACKGROUND OF THE INVENTION

1. Field of the Invention

The present invention relates to an ultrasound image apparatus that irradiates a bonded wafer with an ultrasonic wave from an ultrasonic probe via liquid to generate an image of a bonded surface of the bonded wafer, and a liquid infiltration prevention method that prevents liquid propagating the ultrasonic wave from infiltrating into the bonded surface from an outer peripheral end portion of the bonded wafer when the image of the bonded surface is generated by the ultrasound image apparatus.

2. Description of the Related Art

There is known an ultrasound image apparatus that irradiates an object with an ultrasonic wave from an ultrasonic probe and acquires a reflected wave of the ultrasonic wave to generate an image of the inside of the object. The image generated by the ultrasound image apparatus is used, for example, for inspection of the presence or absence of a fine defect (peeling or void) in the object. When the frequency of the ultrasonic wave to be used is high, the ultrasound image apparatus (ultrasonic inspection apparatus) can obtain high resolution, but on the other hand, attenuation may increase and a S/N ratio may decrease. Here, water has a smaller degree of attenuation of radio frequency ultrasonic waves than air. Therefore, the scanning of the ultrasonic probe may be performed in a state where the object is immersed in water and a space between the ultrasonic probe and the object is filled with water. However, this method may cause a problem such as corrosion of a metal contained in an object due to immersion of the object in water.

Therefore, an invention aimed at limiting a contact region of water in a subject (object) to an inspection surface (bottom surface) of the subject has been proposed (see JP 2015-148493 A). JP 2015-148493 A discloses an ultrasonic inspection apparatus (ultrasound image apparatus) including a subject holding mechanism that holds a subject with an inspection surface facing downward, an array-type probe that probes the subject with an ultrasonic wave, a tank that immerses the array-type probe in a liquid that propagates the ultrasonic wave, a probe holding mechanism that holds the array-type probe below the inspection surface of the subject so as to face the inspection surface, and a horizontal scanning means that horizontally scans one or both of the subject and the array-type probe in a state where the liquid surface is in contact with the inspection surface of the subject due to surface tension of the liquid stored in the tank.

In the invention described in JP 2015-148493 A, a space between the subject and the ultrasonic probe is filled with a liquid such as water, and a liquid film formed on an upper surface of the tank is brought into contact with the inspection surface (bottom surface) of the subject, thereby ensuring a propagation path of the ultrasonic wave. Therefore, in the invention described in JP 2015-148493 A, the subject can be scanned by the ultrasonic probe without immersing the subject in the liquid.

SUMMARY OF THE INVENTION

When scanning an object, an ultrasonic probe repeatedly performs a series of operations of accelerating from a first outer peripheral end portion side toward an opposite second outer peripheral end portion side of the object, decelerating and stopping on the second outer peripheral end portion side, accelerating from the second outer peripheral end portion side toward the first outer peripheral end portion side, and decelerating and stopping on the first outer peripheral end portion side. For this reason, when the acceleration/deceleration in the vicinity of the outer peripheral end portion of the object is large, the surface of the liquid that propagates the ultrasonic wave may be wavy, and the liquid may adhere to the outer peripheral end portion. Here, in a case where the object is a bonded wafer in which two or more wafers are bonded, there is a possibility that liquid adhering to the outer peripheral end portion infiltrates into a bonded surface between the wafers due to a capillary phenomenon. For this reason, when the bonded wafer is scanned with the ultrasonic probe described in JP 2015-148493 A, it is necessary to suppress a scanning speed (moving speed) to be low so that the liquid surface does not undulate, and to reduce the acceleration/deceleration of the ultrasonic probe when the outer peripheral end portion of the bonded wafer is scanned.

However, when the scanning speed of the ultrasonic probe is suppressed to be low, a time required for scanning the bonded wafer becomes long, and generation efficiency of an image of the bonded surface of the bonded wafer by the ultrasound image apparatus decreases. Therefore, in the invention described in JP 2015-148493 A, there is room for improvement from the viewpoint of the image generation efficiency of the bonded surface of the bonded wafer.

An object of the present invention is to prevent liquid from infiltrating into a bonded surface between wafers without reducing a scanning speed of an ultrasonic probe, to shorten a scanning time of the ultrasonic probe with respect to the bonded wafer, and to improve image generation efficiency of the bonded surface.

According to an aspect of the present invention, there is provided an ultrasound image apparatus that irradiates a bonded wafer in which two or more wafers are bonded with an ultrasonic wave and acquires a reflected wave of the ultrasonic wave to generate an image of a bonded surface between the wafers, including: an ultrasonic probe that irradiates the bonded wafer with an ultrasonic wave while moving along a bottom surface on a lower side of the bottom surface of the bonded wafer and acquires a reflected wave of the ultrasonic wave; a liquid ejection unit that moves together with the ultrasonic probe while continuously ejecting a liquid that propagates an ultrasonic wave toward the bottom surface such that a liquid film in contact with the bottom surface is formed between the liquid ejection unit and the bottom surface of the bonded wafer; and a gas ejection device that ejects gas, in which the gas ejection device includes a gas ejection unit that ejects gas for pushing down the liquid toward an outer peripheral end portion of the bonded wafer so that the liquid ejected from the liquid ejection unit does not infiltrate into the bonded surface from the outer peripheral end portion of the bonded wafer.

According to another aspect of the present invention, there is provided a liquid infiltration prevention method for preventing liquid from infiltrating into a bonded surface from an outer peripheral end portion of a bonded wafer when a liquid that propagates an ultrasonic wave is supplied between a bottom surface of the bonded wafer in which two or more wafers are bonded and an ultrasonic probe and the bonded wafer is irradiated with the ultrasonic wave from the ultrasonic probe to generate an image of the bonded surface between the wafers, including: a positioning step of positioning a gas ejection unit that ejects gas and the bonded wafer; a wafer holding step of holding the positioned bonded wafer by a holding unit; a probe arrangement step of arranging the ultrasonic probe on a lower side of the bottom surface of the bonded wafer held by the holding unit; a liquid supply step of supplying a liquid to a case accommodating the ultrasonic probe, filling a space between the ultrasonic probe and the bottom surface of the bonded wafer with the liquid, and forming a liquid film in contact with the bonded wafer on an upper surface of the case; and a scanning step of scanning the ultrasonic probe along the bottom surface together with the case while continuously ejecting liquid from a liquid outlet portion formed on the upper surface of the case such that the liquid film formed on the upper surface of the case is in contact with the bottom surface of the bonded wafer, in which in the scanning step, when the ultrasonic probe is located below the outer peripheral end portion of the bonded wafer, gas is ejected from the gas ejection unit toward the outer peripheral end portion so that liquid ejected from the case does not infiltrate into the bonded surface from the outer peripheral end portion of the bonded wafer, and the liquid ejected from the case is pushed down by the gas ejected from the gas ejection unit.

According to the present invention, it is possible to prevent liquid from infiltrating into a bonded surface between wafers without reducing a scanning speed of an ultrasonic probe, shorten a scanning time of the ultrasonic probe with respect to the bonded wafer, and improve image generation efficiency of the bonded surface.

DESCRIPTION OF THE PREFERRED EMBODIMENTS

Hereinafter, modes for carrying out the present invention will be described in detail with reference to the drawings.

First Embodiment

Figure 1:
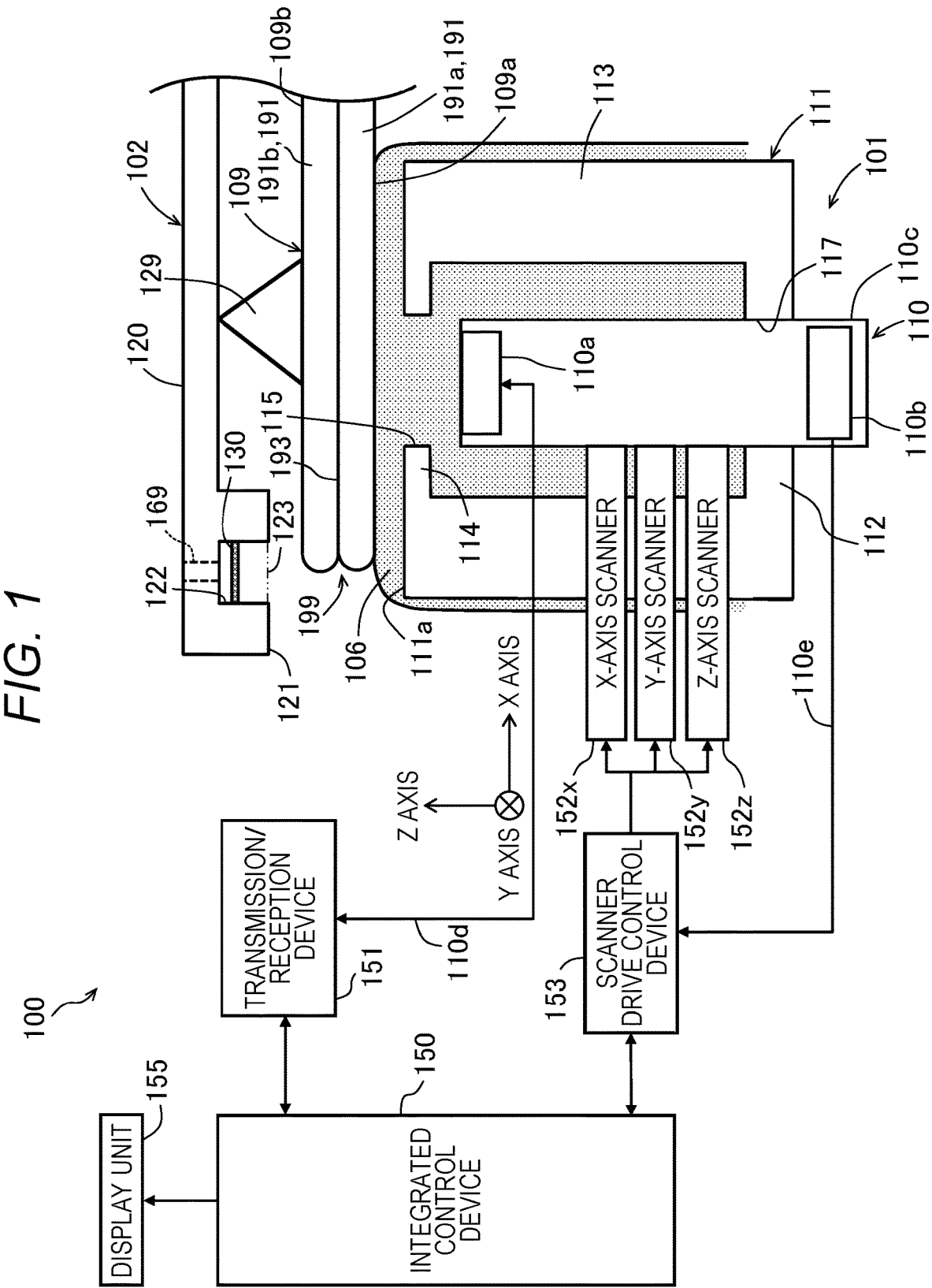
FIG. 1 is a diagram illustrating a configuration of an ultrasound image apparatus according to a first embodiment.
Figure 2:
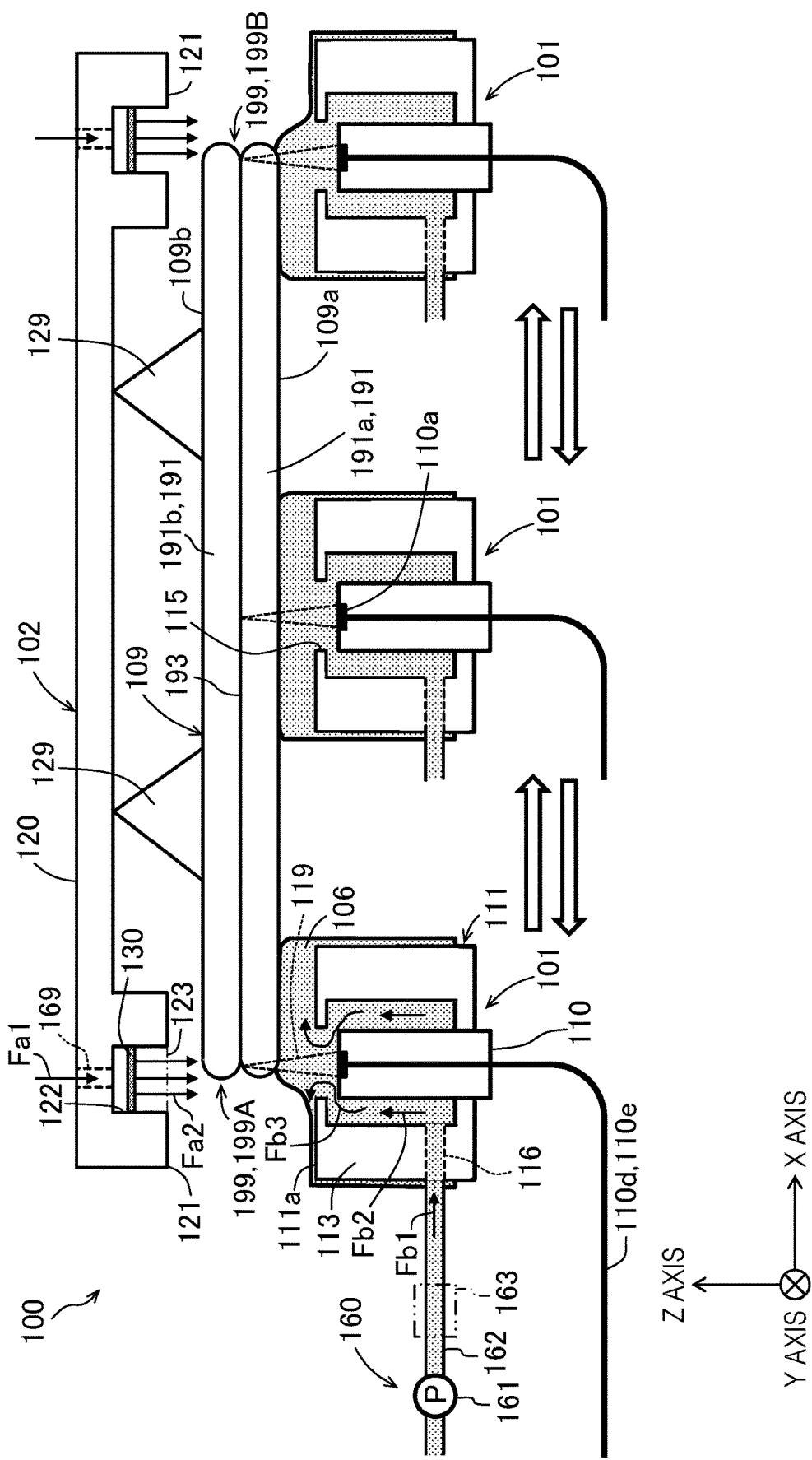
FIG. 2 is a diagram for describing an operation of each unit when an image of a bonded surface of a bonded wafer is generated by the ultrasound image apparatus according to the first embodiment.

With reference to FIGS. 1 to 5, a configuration of an ultrasound image apparatus 100 according to a first embodiment and an image generation method of a bonded surface 193 of a bonded wafer 109 by the ultrasound image apparatus 100 will be described. FIG. 1 is a diagram illustrating a configuration of the ultrasound image apparatus 100. FIG. 2 is a diagram for describing an operation of each unit when an image of the bonded surface 193 of the bonded wafer 109 is generated by the ultrasound image apparatus 100.

As illustrated in the drawing, an X axis, a Y axis, and a Z axis are defined, and a structure, an arrangement relationship, and the like of each configuration will be described using the X axis, the Y axis, and the Z axis. The X axis and the Y axis are parallel to a horizontal direction, and the Z axis is parallel to a vertical direction (gravity direction, up-down direction). The X axis, the Y axis, and the Z axis are orthogonal to each other.

As illustrated in FIG. 1, the ultrasound image apparatus 100 irradiates a bonded wafer (laminated wafer) 109 with an ultrasonic wave 119 (see FIG. 2) from a lower side of the bonded wafer 109 in which two or more semiconductor wafers (also simply referred to as wafers) 191 are bonded in layers, acquires a reflected wave of the ultrasonic wave, and generates an image of the bonded surface 193 between the wafers 191. The image of the bonded surface 193 generated by the ultrasound image apparatus 100 is analyzed by an inspector or an inspection system (not illustrated). The inspector or the inspection system determines the presence or absence of a fine defect such as peeling or voids in the bonded surface 193 based on the image of the bonded surface 193, and specifies the position and size of the defect when the defect is present. That is, the ultrasound image apparatus 100 can also be said to be an ultrasonic inspection apparatus that inspects a defect inside a subject using the bonded wafer 109 as the subject (inspection target).

The bonded wafer 109 to be scanned by an ultrasonic probe (hereinafter, also referred to as a probe) 110 of the ultrasound image apparatus 100 according to the present embodiment is a laminated wafer in which two disk-shaped wafers 191 are bonded in layers. Hereinafter, a lower wafer 191 of the bonded wafer (laminated wafer) 109 is also referred to as a lowermost layer wafer 191a, and an upper wafer 191 of the bonded wafer (laminated wafer) 109 is also referred to as an uppermost layer wafer 191b.

The ultrasound image apparatus 100 includes a holding device 102 that holds the bonded wafer 109, a probe 110 that scans the bonded wafer 109, a probe case (hereinafter, it is simply referred to as a case) 111 that accommodates the probe 110 and stores water that is a liquid for propagating ultrasonic waves, an X-axis scanner 152x and a Y-axis scanner 152y that move the probe 110 in a horizontal plane, and a Z-axis scanner 152z that adjusts or moves the probe 110 in a height direction.

The probe 110 is fixed to the case 111, and the probe 110 and the case 111 constitute a probe unit 101. Note that the probe 110 and the case 111 are connected by, for example, a screw and integrated. The probe 110 may be a single probe having a single transmission element (ultrasonic vibration element) or an array probe in which a large number of transmission elements are arranged. The scanners 152x, 152y, and 152z are connected to at least one of a housing 110c and the case 111 of the probe 110, and move the probe unit 101 in an X-axis direction, a Y-axis direction, and a Z-axis direction. That is, the probe 110 moves integrally with the case 111 by the scanners 152x, 152y, and 152z.

The ultrasound image apparatus 100 includes a display unit 155 such as a liquid crystal display that displays an image, a transmission/reception device 151 that inputs and outputs an electric signal to and from the probe 110, a scanner drive control device 153 that controls operations of the scanners 152x, 152y, and 152z, and an integrated control device 150 that performs integrated control of each unit (display unit 155, transmission/reception device 151, and scanner drive control device 153) of the ultrasound image apparatus 100.

The integrated control device 150 includes, for example, a computer including a processing device such as a central processing unit (CPU), a nonvolatile memory such as a read only memory (ROM), a volatile memory called a random access memory (RAM), an input/output interface, and other peripheral circuits. These pieces of hardware operate software in cooperation to implement a plurality of functions. Note that the integrated control device 150 may include one computer or a plurality of computers.

The nonvolatile memory stores a program capable of executing various calculations. That is, the nonvolatile memory is a storage medium (storage device) capable of reading a program for realizing the functions of the present embodiment. The volatile memory is a storage medium (storage device) that temporarily stores a calculation result by the processing device and a signal input from the input/output interface. The processing device is a device that develops a program stored in a nonvolatile memory in a volatile memory and executes calculation, and performs predetermined calculation processing on data incorporated from an input/output interface, the nonvolatile memory, and the volatile memory according to the program.

The input unit of the input/output interface converts signals input from various devices such as the transmission/reception device 151 and the scanner drive control device 153 into data that can be calculated by the processing device. Furthermore, the output unit of the input/output interface generates a signal for output according to the calculation result in the processing device, and outputs the signal to various devices such as the transmission/reception device 151, the scanner drive control device 153, and the display unit 155.

The probe 110 irradiates the bonded wafer 109 with an ultrasonic wave while moving in the X-axis direction and the Y-axis direction along a bottom surface 109a on the lower side of the bottom surface 109a of the bonded wafer 109, and acquires the reflected wave of the ultrasonic wave. That is, the probe 110 scans the bonded wafer 109 by moving relative to the bonded wafer 109 on the lower side of the bonded wafer 109.

The probe 110 includes a transmission/reception element 110a that transmits an ultrasonic wave and receives the reflected wave of the ultrasonic wave reflected by the bonded wafer 109, an encoder 110b that detects a scanning position of the probe 110, and the housing 110c that accommodates the transmission/reception element 110a and the encoder 110b. The transmission/reception element 110a is connected to the transmission/reception device 151 by a control line 110d, and the encoder 110b is connected to the scanner drive control device 153 by a control line 110e.

The transmission/reception device 151 outputs an element operation signal to the probe 110 based on a control signal from the integrated control device 150. The transmission/reception element 110a of the probe 110 irradiates the bonded wafer 109 with an ultrasonic wave according to the input element operation signal. The ultrasonic wave reflected by the bonded wafer 109 is received by the transmission/reception element 110a. The transmission/reception device 151 receives the signal of the reflected wave of the ultrasonic wave from the probe 110, and transmits a signal intensity of the received signal to the integrated control device 150.

The integrated control device 150 acquires information on the scanning position (scanning point) of the probe 110 from the encoder 110b via the scanner drive control device 153 together with the signal intensity of the reflected wave from the transmission/reception device 151.

The integrated control device 150 stores the scanning position (scanning point) and the signal intensity of the reflected wave in association with each other in the nonvolatile memory. The integrated control device 150 converts the signal intensity of the reflected wave for each scanning position into, for example, a gradation of 0 to 255. The integrated control device 150 generates image data according to the gradation of each scanning position, and outputs the generated image data to the display unit 155. The display unit 155 displays the image of the bonded surface 193 on the display screen based on the input image data.

When there is a defect such as peeling or a void on the bonded surface 193 of the wafer 191 in the bonded wafer 109, the ultrasonic wave transmitted from the probe 110 is reflected by the defect. Therefore, the signal intensities of the reflected waves received by the probe 110 are different between a normal region and a defective region. Therefore, the inspector can determine the presence or absence of the defect from the image displayed on the display unit 155, and identify the position and size of the defect when there is the defect.

The ultrasound image apparatus 100 according to the present embodiment scans the probe 110 in a state where a space between the bottom surface 109a (the lower surface of the lowermost layer wafer 191a) of the bonded wafer 109 and the probe 110 is filled with water. In the present embodiment, an example in which water is used as a propagation medium (liquid medium) of an ultrasonic wave will be described, but the liquid medium is not limited to water. The liquid medium may be any liquid capable of propagating ultrasonic waves.

The case 111 has a box shape capable of holding water. The case 111 includes a bottom plate 112 and a side wall 113 extending upward from an outer peripheral end portion of the bottom plate 112. A through hole 117 through which the probe 110 is inserted is formed in the bottom plate 112. The side wall 113 is provided so as to surround an outer periphery of the probe 110. A top plate 114 is provided at an upper end portion of the side wall 113. A water outlet portion 115 is formed immediately above the probe 110 in the top plate 114. The water outlet portion 115 is an opening formed at a position and a size not interfering with a propagation path of an ultrasonic wave between the probe 110 and the bonded wafer 109.

As illustrated in FIG. 2, a water inlet portion 116 serving as an inlet of water to a hollow portion of the case 111 is formed in the side wall 113 of the case 111. The water inlet portion 116 is connected to a water supply device (liquid supply device) 160. The water supply device 160 includes a pump 161 that ejects water, and a water supply tube 162 that is connected to the pump 161 and is a pipe that supplies water ejected from the pump 161 to the case 111.

The water inlet portion 116 is a communication passage that communicates the hollow portion of the case 111 and the water supply tube 162. In the case 111, water is stored in a hollow portion (inside), and the probe 110 disposed inside the case 111 is immersed in water. The water stored in the case 111 is ejected upward from the water outlet portion 115 and supplied to an upper surface (upper surface of the top plate 114) 111a of the case 111. A liquid film 106 having a predetermined thickness is formed on the upper surface 111a of the case 111 by surface tension of water. The liquid film 106 is in contact with the bottom surface 109a of the bonded wafer 109. A flow rate of the water supplied to the water inlet portion 116 is set to such a flow rate that the surface (liquid surface) of the liquid film 106 does not become wavy.

As illustrated in FIG. 2, the water ejected from pump 161 flows into the case 111 through the water supply tube 162 (see arrow Fb1). The water flowing into the case 111 from the water inlet portion 116 flows upward in a flow path between the outer peripheral surface of the probe 110 and the inner peripheral surface of the side wall 113 of the case 111 (see arrow Fb2), and flows out from the water outlet portion 115 to the upper surface 111a of the case 111 (see arrow Fb3). The water ejected from the water outlet portion 115 flows on the upper surface 111a of the case 111 in a direction away from a central axis side of the probe unit 101, and flows down from the outer peripheral end portion of the upper surface 111a.

A rotational speed of the pump 161 is set so as to achieve a predetermined ejection pressure necessary for maintaining the shape of the liquid film 106. The water supply device 160 may be provided with a flow rate control mechanism 163 capable of adjusting the flow rate of water supplied to the water inlet portion 116 between the pump 161 and the case 111. The flow rate control mechanism 163 includes, for example, a valve capable of adjusting an opening area and a pipe for discharging excess water. In this case, the integrated control device 150 controls the valve of the flow rate control mechanism 163 to adjust the flow rate of the water supplied to the water inlet portion 116. Furthermore, the water supply device 160 may be provided with a pressure regulator that reduces the ejection pressure of the pump 161 between the pump 161 and the flow rate control mechanism 163. That is, the ejection pressure of the water ejected from the water supply device 160 to the case 111 may be defined by the pressure regulator with the rotational speed of the pump 161 as a constant value.

As described above, the case 111 functions as a liquid ejection unit (water ejection unit) that ejects liquid such as water from the water outlet portion 115 toward the bottom surface 109a of the bonded wafer 109. The water supply device 160 continuously supplies water to the case 111 at a predetermined ejection pressure and a predetermined flow rate so that the liquid film 106 formed on the upper surface 111a of the case 111 is maintained at a constant thickness. As a result, the liquid film 106 formed on the upper surface 111a of the case 111 is always in contact with the bottom surface 109a of the bonded wafer 109 during scanning of the probe 110.

As described above, the case 111 is connected to the probe 110 and integrated with the probe 110. Therefore, the case 111 moves together with the probe 110 while continuously ejecting the water that propagates the ultrasonic wave toward the bottom surface 109a such that the liquid film 106 in contact with the bottom surface 109a is formed between the case and the bottom surface 109a of the bonded wafer 109.

The holding device 102 for the bonded wafer 109 will be described with reference to FIGS. 1 and 2. As illustrated in FIGS. 1 and 2, the holding device 102 includes a disk-shaped base portion 120, a plurality of vacuum suction pads 129 attached to the base portion 120, and an air ejection unit 121 provided at an outer peripheral end portion of the base portion 120 to eject air.

The vacuum suction pad 129 is a holding unit that is connected to a vacuum pump (not illustrated), vacuum-sucks an upper surface 109b (an upper surface of the uppermost layer wafer 191b) of the bonded wafer 109, and horizontally holds the bonded wafer 109. The vacuum suction pad 129 holds the bonded wafer 109 such that a distance (vertical distance) from the upper surface 111a of the case 111 to the bottom surface 109a of the bonded wafer 109 is maintained at a predetermined separation distance. Since the holding device 102 includes the air ejection unit 121, it can also be said as an air ejection device (gas ejection device) that ejects air (gas). That is, the holding device (air ejection device) 102 according to the present embodiment has a function of holding the bonded wafer 109 and a function of ejecting air.

The air ejection unit 121 is provided so as to protrude downward from the base portion 120. The air ejection unit 121 has a recessed ejection opening portion 122 recessed upward from the lower surface of the air ejection unit 121. The ejection opening portion 122 is formed in an annular shape in a plan view along the outer peripheral end portion 199 above the outer peripheral end portion 199 of the bonded wafer 109 held by the vacuum suction pad 129. As illustrated in the drawing, an outer shape in a side cross section of the air ejection unit 121 and a shape in a side cross section of the ejection opening portion 122 are rectangular. At the bottom of the ejection opening portion 122, a plurality of air intake units (gas intake units) 169 which communicate the ejection opening portion 122 with an air supply pipe (not illustrated) and take air from the air supply pipe are formed.

The ejection opening portion 122 communicates with the plurality of air intake units 169, and ejects air (see arrow Fa1) having a predetermined pressure taken in from the plurality of air intake units 169 vertically downward from the opening end surface 123 of the ejection opening portion 122 (see arrow Fa2). The ejection opening portion 122 has an inner peripheral surface, an outer peripheral surface, and a bottom surface connecting the inner peripheral surface and the outer peripheral surface. The inner peripheral surface and the outer peripheral surface of the ejection opening portion 122 are formed so as to be parallel to the vertical axis. In the present embodiment, the ejection opening portion 122 is provided at a position overlapping the outer peripheral end portion 199 of the bonded wafer 109 in the up-down direction (vertical direction). That is, the ejection opening portion 122 of the air ejection unit 121 ejects the air taken in from the plurality of air intake units 169 toward the outer peripheral end portion 199 of the bonded wafer 109.

The air ejection unit 121 according to the present embodiment is configured to take air into the ejection opening portion 122 through the plurality of air intake units 169 provided at predetermined intervals in the circumferential direction of the annular ejection opening portion 122 and eject the air downward from the entire opening end surface 123 of the ejection opening portion 122. Therefore, a flow velocity distribution (flow rate distribution) of the air may vary in the entire region of the annular opening end surface 123. For example, there is a difference between a flow velocity of air in a region immediately below the air intake unit 169 and a flow velocity of air in a region not immediately below the air intake unit 169. Therefore, in the present embodiment, a rectifying unit 130 that rectifies the air taken in from the plurality of air intake units 169 is provided over the entire region of the annular ejection opening portion 122 in a plan view.

The rectifying unit 130 according to the present embodiment is a filter made of a plate-like porous body such as a foam in which a plurality of air through-holes are formed. The air taken into the ejection opening portion 122 from the plurality of air intake units 169 is dispersed by the rectifying unit 130, and is ejected at a uniform ejection pressure and a uniform flow rate over the entire region of the annular ejection opening portion 122. That is, according to the present embodiment, it is possible to suppress the variation in the flow velocity distribution (flow rate distribution) of the air ejected from the annular ejection opening portion 122 as compared with the case where the rectifying unit 130 is not provided.

The rectifying unit 130 may be formed by stacking plate-shaped porous bodies in multiple layers in the up-down direction. In this case, a porous body disposed on the lower layer side preferably has more air through-holes having a smaller diameter than a porous body disposed on the upper layer side. As a result, the ejection pressure of the air ejected from the ejection opening portion 122 can be made more uniform. As the porous body used for the rectifying unit 130, a porous body made of resin, metal, or ceramics can be applied, but in consideration of processability, a porous body made of resin is preferably applied.

While the probe 110 scans the bonded wafer 109, air is constantly ejected from the air ejection unit 121. That is, in the present embodiment, when the probe 110 is located below the outer peripheral end portion 199 of the bonded wafer 109, the air ejection unit 121 ejects air toward a partial region (a region near the outer peripheral end portion 199 where the bonded wafer 109 does not exist above) of the liquid film 106 formed by the water ejected from the water outlet portion 115 of the case 111. Air is applied from above to the liquid film 106 in the region near the outer peripheral end portion 199, so that the liquid surface in the region near the outer peripheral end portion 199 is pushed down. Therefore, water in the region near the outer peripheral end portion 199 is prevented from infiltrating into the bonded surface 193 from the outer peripheral end portion 199 of the bonded wafer 109.

Here, in an ultrasound image apparatus (hereinafter, it is referred to as an ultrasound image apparatus according to a comparative example) that does not include the air ejection unit 121 that ejects air toward the outer peripheral end portion 199 of the bonded wafer 109, in a process of scanning the bonded wafer 109 with the probe 110, there is a possibility that the surface of the liquid film 106 is wavy when acceleration or deceleration is performed at the outer peripheral end portion 199 of the bonded wafer 109, water adheres to the outer peripheral end portion 199, and infiltrates into the bonded surfaces 193 of the wafers 191. Therefore, in the comparative example, it is necessary to suppress the scanning speed to be low so that the surface of the liquid film 106 is not wavy, and to reduce the acceleration/deceleration of the probe 110 when scanning is performed around the outer peripheral end portion 199 of the bonded wafer 109. For this reason, in the ultrasound image apparatus according to the comparative example, the time required for scanning the bonded wafer 109 becomes long due to the suppression of the scanning speed to be low, and the generation efficiency of the image of the bonded surface 193 by the ultrasound image apparatus decreases.

Meanwhile, the ultrasound image apparatus 100 according to the present embodiment includes the air ejection unit 121 that ejects air for pushing down water toward the outer peripheral end portion 199 of the bonded wafer 109 so that the water ejected from the case 111 does not infiltrate into the bonded surface 193 from the outer peripheral end portion 199 of the bonded wafer 109. As a result, in the present embodiment, even when the scanning speed of the probe 110 is faster than that in the comparative example and the acceleration/deceleration of the probe 110 around the outer peripheral end portion 199 of the bonded wafer 109 is high, water is prevented from infiltrating the bonded surface 193.

Figure 3:
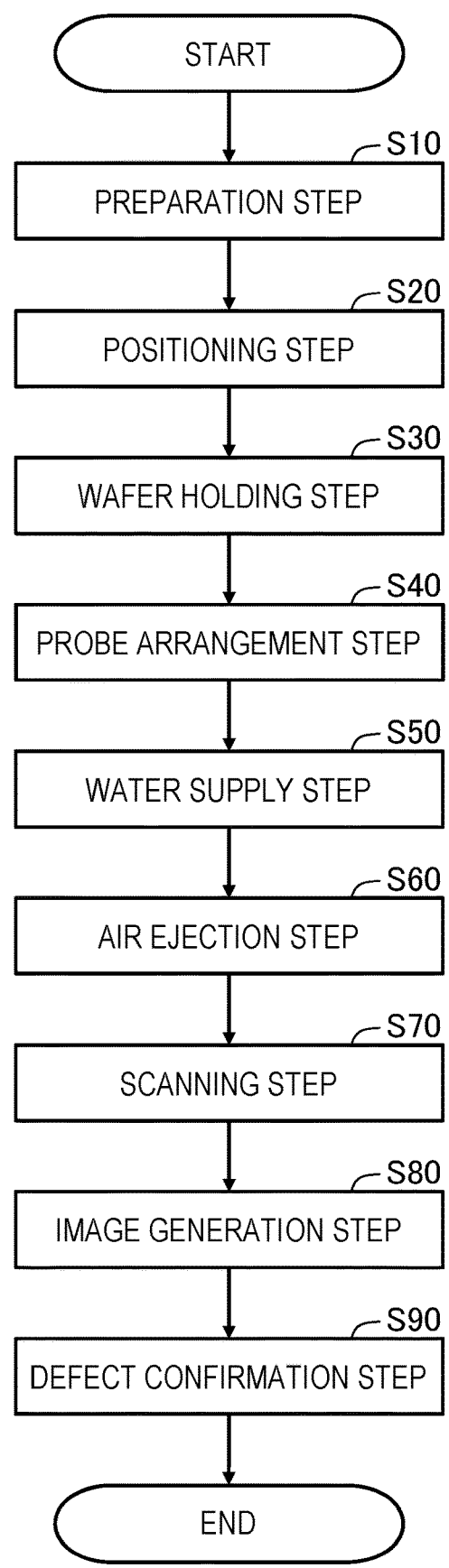
FIG. 3 is a flowchart illustrating an example of an implementation procedure of an ultrasonic inspection method.

An ultrasonic inspection method for the bonded wafer 109 by the ultrasound image apparatus 100 will be described with reference to FIG. 3. FIG. 3 is a flowchart illustrating an example of an implementation procedure of the ultrasonic inspection method. Note that this ultrasonic inspection method includes a water infiltration prevention method (liquid infiltration prevention method) for preventing water from infiltrating the bonded surface 193 from the outer peripheral end portion 199 of the bonded wafer 109 when generating an image of the bonded surface 193 between the wafers 191 by supplying water propagating an ultrasonic wave between the bottom surface 109a of the bonded wafer 109 and the probe 110 and irradiating the bonded wafer 109 with the ultrasonic wave from the probe 110 (S20 to S70).

As illustrated in FIG. 3, in the ultrasonic inspection of the bonded wafer 109, a preparation step S10, a positioning step S20, a wafer holding step S30, a probe arrangement step S40, a water supply step (liquid supply step) S50, an air ejection step (gas ejection step) S60, a scanning step S70, an image generation step S80, and a defect confirmation step S90 are performed in this order.

In the preparation step S10, each device is activated, and the bonded wafer 109 to be inspected is selected. In the positioning step S20, the holding device 102 having the air ejection unit 121 and the bonded wafer 109 are positioned. The positioning between the holding device 102 and the bonded wafer 109 will be described in detail with reference to FIGS. 4A to 4C.

When a large positional deviation occurs between the air ejection unit 121 and the bonded wafer 109, there is a possibility that the water cannot be appropriately pushed down by the air ejected from the air ejection unit 121. The inventors of the present application have repeatedly studied the positional relationship between the air ejection unit 121 and the outer peripheral end portion 199 of the bonded wafer 109, which allows the water to be appropriately pushed down by the air ejected from the air ejection unit 121.

Figure 4A:
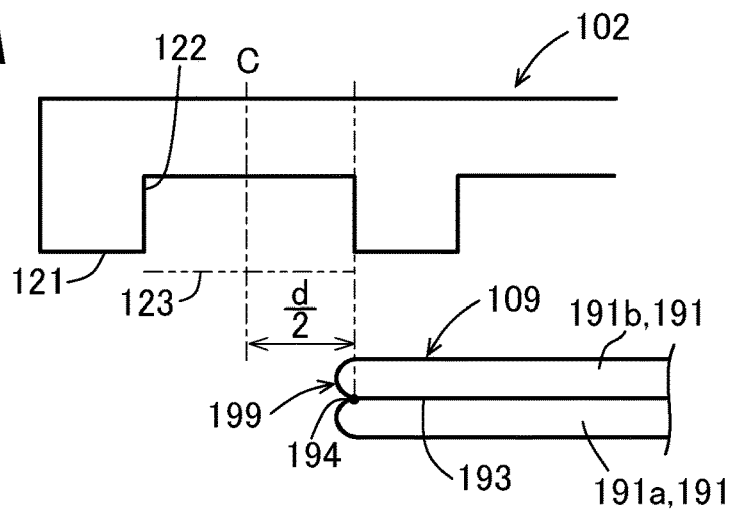
FIG. 4A is a partially enlarged view of an ejection opening portion and an outer peripheral end portion of the bonded wafer, and illustrates a state in which an outer peripheral end edge of the bonded surface of the bonded wafer is disposed at a position shifted by d/2 in an inner diameter direction from a radial central axis of the ejection opening portion.

Hereinafter, the radial direction of the holding device 102 having a circular shape in a plan view is referred to as a radial direction, and the positional relationship between the air ejection unit 121 and the bonded wafer 109 will be described with the central axis of the radial width of the ejection opening portion 122 in the cross section illustrated in FIGS. 4A to 4C as a radial central axis C.

In a numerical fluid simulation, when the ejection opening portion 122 is positioned vertically above the outer peripheral end portion 199 of the bonded wafer 109, most of the ejected air grazes over the outer peripheral end portion 199 of the bonded wafer 109 and flows toward the liquid level around the probe 110. Therefore, as illustrated in FIG. 4A, in the direction in which the radial width of the opening end surface 123 of the ejection opening portion 122 when viewed from the lower side of the bonded wafer 109 increases, the outer peripheral end edge 194 of the bonded surface 193 can be brought close to the inner peripheral edge of the ejection opening portion 122. In other words, when the inner peripheral edge of the ejection opening portion 122 is positioned vertically above the outer peripheral end edge 194 of the bonded surface 193, the water on the probe unit 101 can be pushed down by the air ejected from the ejection opening portion 122 and flowing downward along the outer peripheral end portion 199 of the bonded wafer 109. That is, assuming that a radial width of the ejection opening portion 122 is d, an allowable amount of deviation in the inner diameter direction of the bonded wafer 109 with respect to the radial central axis C of the ejection opening portion 122 is less than d/2.

Figure 4B:
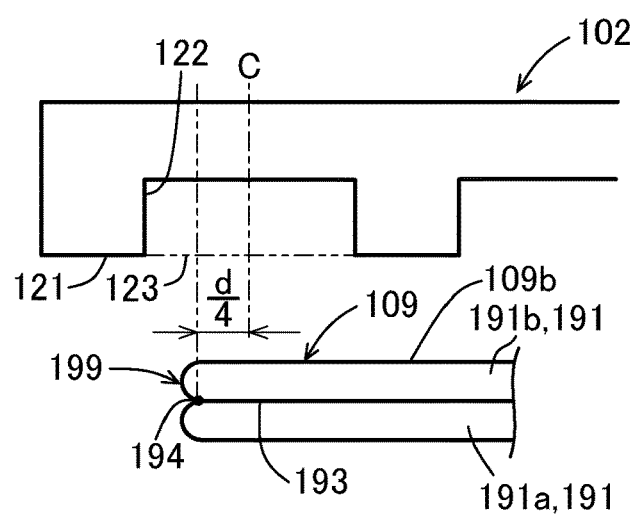
FIG. 4B is a partially enlarged view of the ejection opening portion and the outer peripheral end portion of the bonded wafer, and illustrates a state in which the outer peripheral end edge of the bonded surface of the bonded wafer is disposed at a position shifted by d/4 in the outer diameter direction from the radial central axis of the ejection opening portion.

Meanwhile, as illustrated in FIG. 4B, when the outer peripheral end edge 194 of the bonded surface 193 is shifted to the outer peripheral end edge of the ejection opening portion 122 in a direction in which the radial width of the opening end surface 123 of the ejection opening portion 122 is narrowed when the bonded wafer 109 is viewed from the lower side, most of the air ejected from the ejection opening portion 122 flows along the upper surface 109b of the bonded wafer 109, so that the effect of pushing down the water on the probe unit 101 is reduced. Therefore, assuming that the radial width of the ejection opening portion 122 is d, the allowable amount of positional deviation of the bonded wafer 109 in the outer radial direction with respect to the radial central axis C of the ejection opening portion 122 is preferably d/4 or less from the experimental result.

Figure 4C:
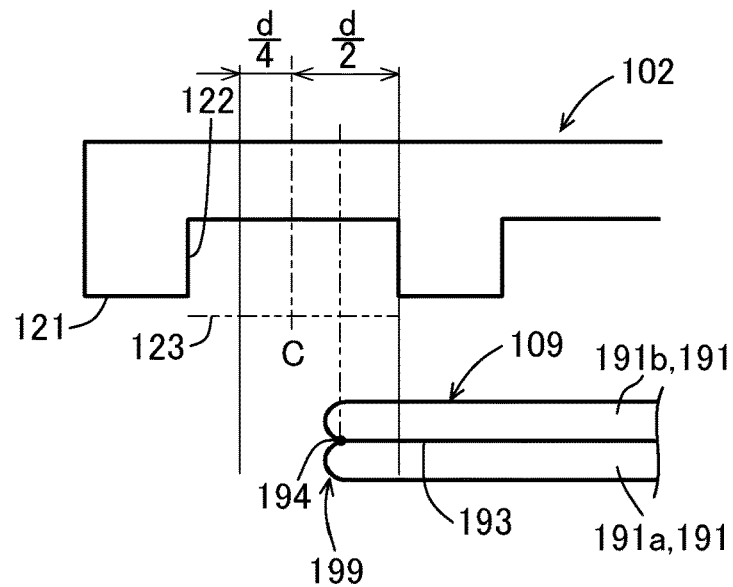
FIG. 4C is a partially enlarged view of the ejection opening portion and the outer peripheral end portion of the bonded wafer, and illustrates a positional deviation allowable range of the outer peripheral end edge of the bonded surface of the bonded wafer.

Therefore, in the positioning step S20, as illustrated in FIG. 4C, the bonded wafer 109 is positioned with respect to the holding device 102 such that the outer peripheral end edge 194 of the bonded surface 193 falls within a range (hereinafter, also referred to as an allowable range) of less than d/2 in the inner diameter direction from the radial central axis C of the ejection opening portion 122 and d/4 or less in the outer diameter direction from the radial central axis C. Note that this positioning condition is preferably satisfied over the entire circumference of the ejection opening portion 122 of the air ejection unit 121 and the outer peripheral end portion 199 of the bonded wafer 109.

That is, it is preferable that the ejection opening portion 122 of the air ejection unit 121 is formed so that the outer peripheral end edge 194 of the bonded surface 193 can be kept within the allowable range over the entire circumference of the outer peripheral end portion 199 of the bonded wafer 109 even when positional deviation occurs when the bonded wafer 109 is held by the holding device 102 or positional deviation occurs due to manufacturing tolerance of the holding device 102 or the like. As a result, the water on the upper surface of the probe unit 101 can be pushed down by the air ejected from the ejection opening portion 122 of the air ejection unit 121 over the entire circumference of the outer peripheral end portion 199 of the bonded wafer 109. As a result, it is possible to prevent water from infiltrating into the bonded surface 193 over the entire circumference of the outer peripheral end portion 199 of the bonded wafer 109.

In the present embodiment, the bonded wafer 109 is positioned such that the outer peripheral end edge 194 of the bonded surface 193 is positioned on the radial central axis C of the ejection opening portion 122 of the air ejection unit 121.

In the wafer holding step S30 illustrated in FIG. 3, the holding device 102 causes the upper surface 109b of the bonded wafer 109 positioned in the positioning step S20 to be sucked to the plurality of vacuum suction pads 129. The plurality of vacuum suction pads 129 horizontally hold the bonded wafer 109. Note that holding the bonded wafer 109 horizontally means holding the bonded wafer with a target that a reference surface (upper surface 109b, bottom surface 109a, bonded surface 193, and the like) of the bonded wafer 109 becomes horizontal.

The distance in the vertical direction between the bonded wafer 109 and the opening end surface 123 of the ejection opening portion 122 is constant over the entire circumference. In the present embodiment, the surface of the bonded wafer 109 opposite to the bottom surface 109a (inspection surface) is fixed and held by vacuum suction, but the bonded wafer 109 may be held by another method as long as the scanning of the probe 110 is not hindered.

In the probe arrangement step S40, the probe unit 101 is arranged at a scanning initial position. The scanning initial position is a position below the bottom surface 109a of the bonded wafer 109 held by the vacuum suction pad 129. The distance in the vertical direction between the probe 110 and the bonded wafer 109 is determined by a focal length of the probe 110 and a depth (distance in the vertical direction from the bottom surface 109a of the bonded wafer 109 to the bonded surface 193) of the bonded surface 193 to be observed. The distance in the vertical direction between the upper surface 111a of the case 111 and the bottom surface 109a of the bonded wafer 109 is preferably set to, for example, about 0.3 to 3 mm.

In the water supply step S50, the supply of water ejected from the pump 161 to the probe unit 101 is started. The thickness of the liquid film 106 on the upper surface 111a of the case 111 is determined according to the distance between the probe 110 and the bonded wafer 109.

Note that it is necessary to increase the thickness of the liquid film 106 as the distance between the probe 110 and the bonded wafer 109 increases. Therefore, when it is known in advance that the distance between the probe 110 and the bonded wafer 109 increases, it is preferable to use the case 111 formed of a material having high hydrophobicity (water repellency). A coating material having high hydrophobicity may be applied to the upper surface 111a of the case 111. Meanwhile, when it is known in advance that the distance between the probe 110 and the bonded wafer 109 decreases, the case 111 formed of a highly hydrophilic material can be used.

In other words, when the hydrophobicity (water repellency) of the upper surface 111a of the case 111 of the probe unit 101 is high, the thickness of the liquid film 106 increases, so that the distance from the upper surface 111a of the case 111 to the bottom surface 109a of the bonded wafer 109 can be set large. Meanwhile, when the hydrophilicity of the upper surface 111a of the case 111 of the probe unit 101 is high, the thickness of the liquid film 106 becomes small, so that the distance from the upper surface 111a of the case 111 to the bottom surface 109a of the bonded wafer 109 needs to be set small.

The flow rate and the pressure of the water supplied to the probe unit 101 are set to a flow rate and a pressure at which the surface (liquid surface) of the liquid film 106 formed on the upper surface 111a of the case 111 is not wavy due to the surface tension of the water and can be regarded as a substantially isostatic surface.

As described above, in the water supply step S50, the water is supplied to the case 111 accommodating the probe 110, the space between the probe 110 and the bottom surface 109a of the bonded wafer 109 is filled with water, and the liquid film 106 in contact with the bonded wafer 109 is formed on the upper surface 111a of the case 111.

In the air ejection step S60, the ejection of air from the air ejection unit 121 is started. An annular rectifying unit (filter) 130 is provided over the entire region of the ejection opening portion 122 of the air ejection unit 121. Therefore, the air taken in from the air intake unit 169 is ejected at a uniform ejection pressure over the entire region of the opening end surface 123 of the ejection opening portion 122 by the rectifying unit 130.

A difference (hereinafter, also referred to as an altitude difference) between the height of the opening end surface 123 of the ejection opening portion 122 and the height of the upper surface 109b of the bonded wafer 109 is preferably about 1 to 3 mm. Although there may be a larger difference in altitude, since the ejected air is diffused so that the air easily escapes along the upper surface 109b of the bonded wafer 109, it is necessary to increase the flow velocity of the air flow when the difference in altitude is large. However, in a case where the altitude difference is set to be large and the flow velocity of the air flow is increased, energy efficiency of an air supply source (air compressor or the like) is lowered. Therefore, it is preferable to set the altitude difference to be as small as possible.

In the present embodiment, the air ejection unit 121 is formed so as to protrude toward the bonded wafer 109 side as compared with the base portion 120 holding the vacuum suction pad 129. Therefore, the opening end surface 123 of the air ejection unit 121 can be brought close to the bonded wafer 109, and the flow velocity of the air flow can be reduced. As a result, the energy efficiency of the air supply source can be improved.

Although not illustrated, the pressure of the air supplied from the air supply source is controlled by a pressure regulator, and the flow rate of the air supplied from the air supply source is controlled by an air flow rate control device including an air flow rate sensor and a flow rate control mechanism capable of adjusting the air flow rate. The air flow rate control device controls the flow rate of the air supplied from the air supply source to the air intake unit 169 of the holding device 102 based on the control signal from the integrated control device 150.

Figure 5:
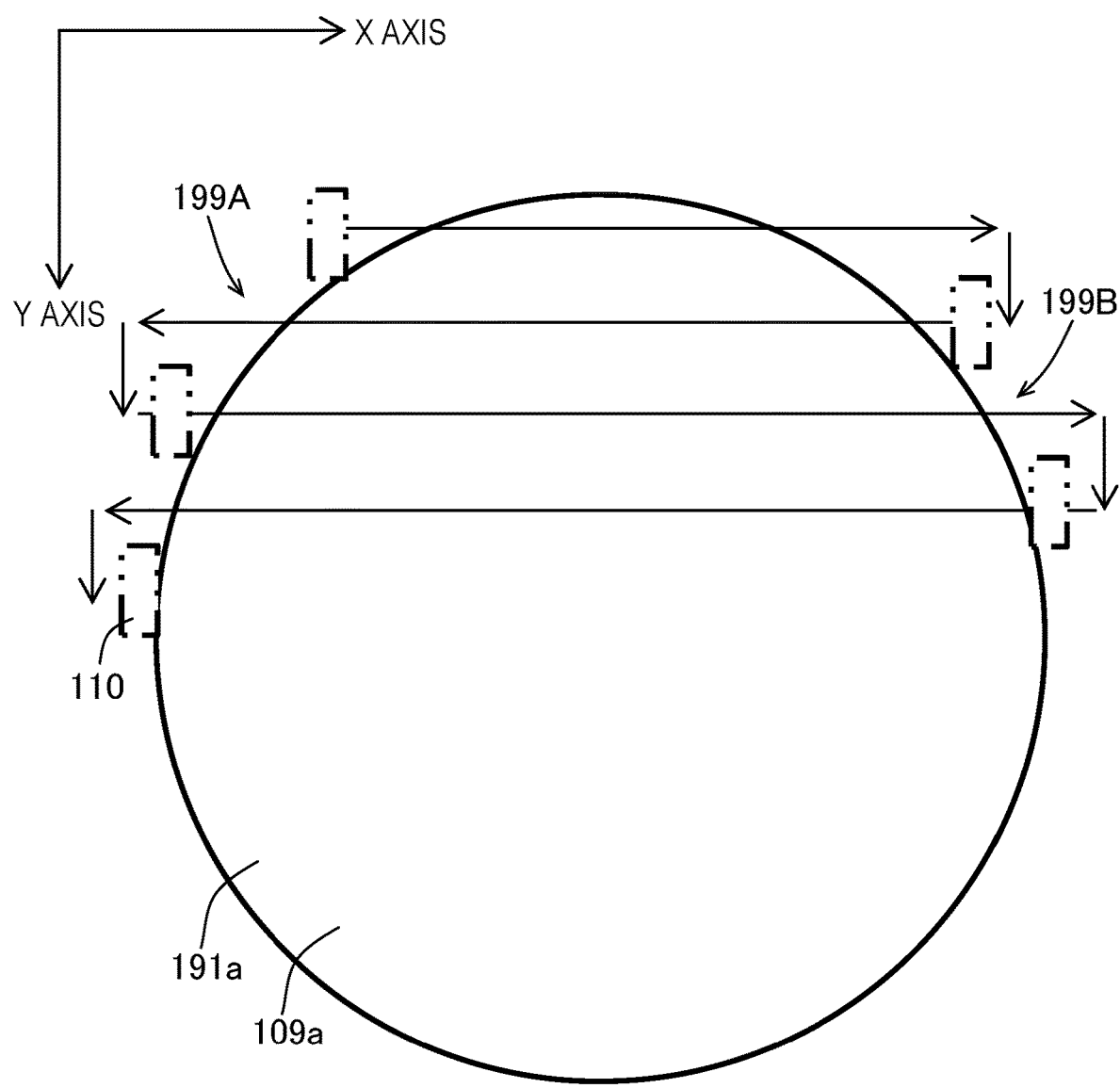
FIG. 5 is a bottom view of the bonded wafer, and illustrates a state in which a probe scans the bonded wafer.

In the scanning step S70, the probe unit 101 is scanned along the bottom surface 109a of the bonded wafer 109. The scanning step S70 will be described in detail with reference to FIGS. 2 and 5. FIG. 5 is a bottom view of the bonded wafer 109 and illustrates a state in which the probe 110 scans the bonded wafer 109. As illustrated in FIG. 2, water is continuously supplied to the upper surface 111a of the case 111 of the probe unit 101. Further, air is continuously ejected from the air ejection unit 121. In the scanning step S70, the integrated control device 150 scans the probe 110 along the bottom surface 109a together with the case 111 while continuously ejecting water from the water outlet portion 115 formed on the upper surface 111a of the case 111 such that the liquid film 106 formed on the upper surface 111a of the case 111 is in contact with the bottom surface 109a of the bonded wafer 109.

In the scanning step S70, as illustrated in FIG. 5, on the lower side of the bottom surface 109a of the lowermost layer wafer 191a of the bonded wafer 109, the integrated control device 150 performs a forward movement process of moving the probe 110 in the X-axis direction with an outer peripheral end portion (hereinafter, also referred to as a first outer peripheral end portion 199A) on one side (left side in the drawing) of the bonded wafer 109 as a start point (scanning initial position) and an outer peripheral end portion (hereinafter, also referred to as a second outer peripheral end portion 199B) opposite to the first outer peripheral end portion 199A as an end point. Thereafter, the integrated control device 150 performs a shift process of shifting the probe 110 by a predetermined distance in the Y-axis direction. Further, the integrated control device 150 performs a backward movement process of moving the probe 110 in the X-axis direction with the second outer peripheral end portion 199B as a start point and the first outer peripheral end portion 199A as an end point. Thereafter, the integrated control device 150 again performs a shift process of shifting the probe 110 by a predetermined distance in the Y-axis direction. As described above, the integrated control device 150 drives the X-axis scanner 152x, the Y-axis scanner 152y, and the Z-axis scanner 152z via the scanner drive control device 153, irradiates the bonded wafer 109 with the ultrasonic wave 119 by the probe 110 from the lower side of the bottom surface 109a via the transmission/reception device 151 while repeatedly performing a series of processes including the forward movement process, the shift process, the backward movement process, and the shift process, and acquires the reflected wave of the ultrasonic wave.

As illustrated in FIG. 2, the probe 110 and the case 111 move in synchronization with each other. FIG. 2 illustrates the probe unit 101 when the center of the transmission/reception element 110a of the probe 110 is located at the first outer peripheral end portion 199A of the bonded wafer 109, the center of the bonded wafer 109, and the second outer peripheral end portion 199B of the bonded wafer 109. In the scanning step S70, the probe unit 101 accelerates from the first outer peripheral end portion 199A toward the second outer peripheral end portion 199B of the bonded wafer 109, starts decelerating before the second outer peripheral end portion 199B, and stops at the second outer peripheral end portion 199B. Further, the probe unit 101 accelerates from the second outer peripheral end portion 199B of the bonded wafer 109 toward the first outer peripheral end portion 199A, starts decelerating before the first outer peripheral end portion 199A, and stops at the first outer peripheral end portion 199A. When the probe unit 101 is located at the outer peripheral end portion 199 of the bonded wafer 109, the bonded wafer 109 is not present above the liquid film 106 formed on the upper surface 111a of the case 111.

Here, in the ultrasound image apparatus according to the comparative example which does not include the air ejection unit 121, the thickness of the liquid film 106 is thicker in the region where the bonded wafer 109 does not exist above than in the region where the bonded wafer 109 exists above in the region of the upper surface of the probe unit 101. In addition, immediately after the acceleration of the probe unit 101 starts or immediately after the stop, there is a possibility that water infiltrates into the bonded surface 193 from the outer peripheral end portion 199 of the bonded wafer 109 due to the waviness of the liquid surface.

Meanwhile, in the present embodiment, when the probe 110 is positioned below the outer peripheral end portion 199 of the bonded wafer 109 in the scanning step S70, air is ejected from the air ejection unit 121 toward the outer peripheral end portion 199 so that the water ejected from the case 111 does not infiltrate into the bonded surface 193 from the outer peripheral end portion 199 of the bonded wafer 109, and the water ejected from the case 111 is pushed down by the air ejected from the air ejection unit 121. As described above, in the present embodiment, the air flow from the air ejection unit 121 pushes down the liquid level of the region where the bonded wafer 109 does not exist above in the region of the upper surface of the probe unit 101. Therefore, water is prevented from infiltrating into the bonded surface 193 from the outer peripheral end portion 199 of the bonded wafer 109.

When the flow velocity of the air ejected from the air ejection unit 121 is too large, an air flow infiltrates into between the bottom surface 109a of the bonded wafer 109 and the upper surface 111a of the case 111, and a propagation path of an ultrasonic wave by water (liquid medium) is hindered. Meanwhile, when the flow velocity of the air ejected from the air ejection unit 121 is too low, a force for pushing down the surface of the liquid film on the upper surface 111a of the case 111 becomes weak, and water may infiltrate into the bonded surface 193. The inventors of the present application confirmed by a numerical fluid simulation and experiment that the flow velocity of the air ejected from the air ejection unit 121 toward the outer peripheral end portion 199 of the bonded wafer 109 is preferably 2.5 to 7.5 [m/s].

In the scanning step S70 illustrated in FIG. 3, the integrated control device 150 acquires and stores the signal intensity of the reflected wave at each scanning position. When the scanning step S70 is completed, the process proceeds to the image generation step S80, and the integrated control device 150 generates image data based on the signal intensity of the reflected wave at each scanning position, and outputs the generated image data to the display unit 155. The display unit 155 displays the image on the display screen based on the input image data.

When the image generation step S80 is completed and the image of the bonded surface 193 of the bonded wafer 109 is displayed on the display unit 155, the process proceeds to the defect confirmation step S90. In the defect confirmation step S90, the inspector checks whether or not a defect such as peeling or a void is generated on the bonded surface 193. When there is a defect, the inspector identifies the location and size of the defect.

When the defect confirmation step S90 is completed, the inspection of the bonded wafer 109 selected in the preparation step S10 is completed, the inspection of the next bonded wafer 109 is started, and steps S10 to S90 are performed again.

The order of the steps is not limited to the example illustrated in FIG. 3. For example, the order of the water supply step S50 and the air ejection step S60 may be reversed. However, when the bonded wafer 109 having a predetermined specification is inspected for the first time, as illustrated in FIG. 3, it is preferable to set the ejection pressure and the flow rate of water in the water supply step S50 and then set the ejection pressure and the flow rate of the air flow. Accordingly, in the air ejection step S60, it is possible to appropriately set the ejection pressure and the flow rate of an air flow capable of effectively pushing down the water formed on the upper surface of the probe unit 101.

According to the above-described embodiment, the following operational effects are obtained.

(1) As described with reference to FIGS. 1 and 2, the ultrasound image apparatus 100 according to the present embodiment irradiates the bonded wafer 109 in which two or more wafers 191 are bonded with an ultrasonic wave and acquires the reflected wave of the ultrasonic wave to generate the image of the bonded surface 193 between the wafers 191. The ultrasound image apparatus 100 includes the probe (ultrasonic probe) 110 that irradiates the bonded wafer 109 with the ultrasonic wave while moving along the bottom surface 109a on a lower side of the bottom surface 109a of the bonded wafer 109 and acquires the reflected wave of the ultrasonic wave, the case (liquid ejection unit) 111 that moves together with the probe 110 while continuously ejecting water (liquid) that propagates the ultrasonic wave toward the bottom surface 109a so that the liquid film 106 in contact with the bottom surface 109a is formed between the case and the bottom surface 109a of the bonded wafer 109, and the holding device (gas ejection device) 102 that includes the air ejection unit (gas ejection unit) 121 for ejecting air (gas). The air ejection unit 121 ejects air for pushing down water toward the outer peripheral end portion 199 of the bonded wafer 109 so that the water ejected from the case 111 does not infiltrate into the bonded surface 193 from the outer peripheral end portion 199 of the bonded wafer 109.

Further, as described with reference to FIGS. 2, 3, and 5, the water infiltration prevention method (liquid infiltration prevention method) according to the present embodiment includes the positioning step S20 of positioning the air ejection unit 121 that ejects air and the bonded wafer 109, the wafer holding step S30 of holding the positioned bonded wafer 109 by the vacuum suction pad (holding unit) 129, the probe arrangement step S40 of arranging the probe 110 on the lower side of the bottom surface 109a of the bonded wafer 109 held by the vacuum suction pad 129, and the water supply step (liquid supply step) S50 of supplying water to the case 111 accommodating the probe 110 to fill the space between the probe 110 and the bottom surface 109a of the bonded wafer 109 with water and forming the liquid film 106 in contact with the bonded wafer 109 on the upper surface 111a of the case 111, and the scanning step S70 of scanning the probe 110 along the bottom surface 109a together with the case 111 while continuously ejecting water from the water outlet portion (liquid outlet portion) 115 formed on the upper surface 111a of the case 111 such that the liquid film 106 formed on the upper surface 111a of the case 111 is in contact with the bottom surface 109a of the bonded wafer 109. In the scanning step S70, when the probe 110 is positioned below the outer peripheral end portion 199 of the bonded wafer 109, air is ejected from the air ejection unit 121 toward the outer peripheral end portion 199 so that water ejected from the case 111 does not infiltrate into the bonded surface 193 from the outer peripheral end portion 199 of the bonded wafer 109, and the water ejected from the case 111 is pushed down by the gas ejected from the air ejection unit 121.

The case 111 moves in synchronization with the probe 110 while continuously supplying water at a predetermined ejection pressure so as to maintain a predetermined separation distance from the bottom surface 109a and maintain the shape of the liquid film 106 having a predetermined thickness formed between the case and the bottom surface 109a. As a result, a contact region of the water can be limited only to the bottom surface 109a. The air ejected from the air ejection unit 121 forcibly pushes down the surface of the liquid film 106 formed in the region of the upper surface 111a of the case 111 where the bonded wafer 109 does not exist above, and it is possible to prevent water from approaching the outer peripheral end edge 194 of the bonded surface 193 of the bonded wafer 109. Therefore, according to the present embodiment, it is possible to prevent water from infiltrating into the bonded surface 193 between the wafers 191 without reducing the scanning speed of the probe 110. As a result, the scanning time of the probe 110 with respect to the bonded wafer 109 can be shortened, and the image generation efficiency of the bonded surface 193 can be improved. The improvement of the image generation efficiency of the bonded surface 193 leads to the improvement of the efficiency of the inspection using the image, leading to the improvement of the production efficiency of the product using the bonded wafer 109.

In addition, since the infiltration of water into the bonded surface 193 is prevented, it is possible to prevent the occurrence of a defect caused by the infiltration of water. For example, corrosion of metal present on the bonded surface 193 can be prevented. In addition, in a case where the inspection of the bonded wafer 109 is performed before the metals of the wafer 191 are bonded to each other, when water infiltrates into the bonded surface 193, an oxide film is formed on the metal, and thus, the metals after the inspection may not be appropriately bonded to each other. In the present embodiment, since water is prevented from infiltrating into the bonded surface 193, it is possible to appropriately bond the metals after the inspection of the bonded wafer 109.

(2) The ultrasound image apparatus 100 includes the water supply device (liquid supply device) 160 that supplies water (liquid) to the case 111 such that the liquid film 106 formed on the upper surface 111a of case 111 is held at a constant thickness. According to this configuration, it is possible to appropriately generate the image of the bonded surface 193 as compared with a case where the thickness of the liquid film 106 fluctuates, and it is possible to appropriately prevent water from infiltrating into the bonded surface 193.

(3) The air ejection unit 121 includes the plurality of air intake units (gas intake units) 169 that takes in air, the ejection opening portion 122 that communicates with the plurality of air intake units 169 and ejects the air taken in from the plurality of air intake units 169 toward the outer peripheral end portion 199 of the bonded wafer 109, and the rectifying unit 130 that is provided in the ejection opening portion 122 and rectifies the air taken in from the plurality of air intake units 169. The ejection opening portion 122 is formed in an annular shape along the outer peripheral end portion 199 above the outer peripheral end portion 199 of the bonded wafer 109. The rectifying unit 130 is provided over the entire region of the ejection opening portion 122.

In this configuration, the air taken in from the air intake unit 169 is ejected at a uniform ejection pressure over the entire region of the opening end surface 123 of the ejection opening portion 122 by the rectifying unit 130. As a result, it is possible to appropriately prevent infiltration of water from the outer peripheral end edge 194 of the bonded surface 193 in the entire circumference of the outer peripheral end portion 199 of the bonded wafer 109.

The holding device (gas ejection device) 102 includes the vacuum suction pad 129 as the holding unit that horizontally holds the bonded wafer 109. The vacuum suction pad 129 holds the bonded wafer 109 such that the distance from the upper surface 111a of the case 111 to the bottom surface 109a of the bonded wafer 109 is maintained at a predetermined separation distance. In this configuration, the holding device 102 has the function of ejecting air toward the outer peripheral end portion 199 of the bonded wafer 109 and the function of holding the bonded wafer 109. Therefore, as compared with a case where a device for holding the bonded wafer 109 and a device for ejecting air to the bonded wafer 109 are individually provided, the number of components can be reduced, and air can be accurately ejected toward the outer peripheral end portion 199 of the bonded wafer 109.

Second Embodiment

An ultrasound image apparatus 200 according to a second embodiment of the present invention will be described with reference to FIGS. 6 and 7. The same or corresponding components as or to those described in the first embodiment will be denoted by the same reference signs, and differences will be mainly described.

Figure 6:
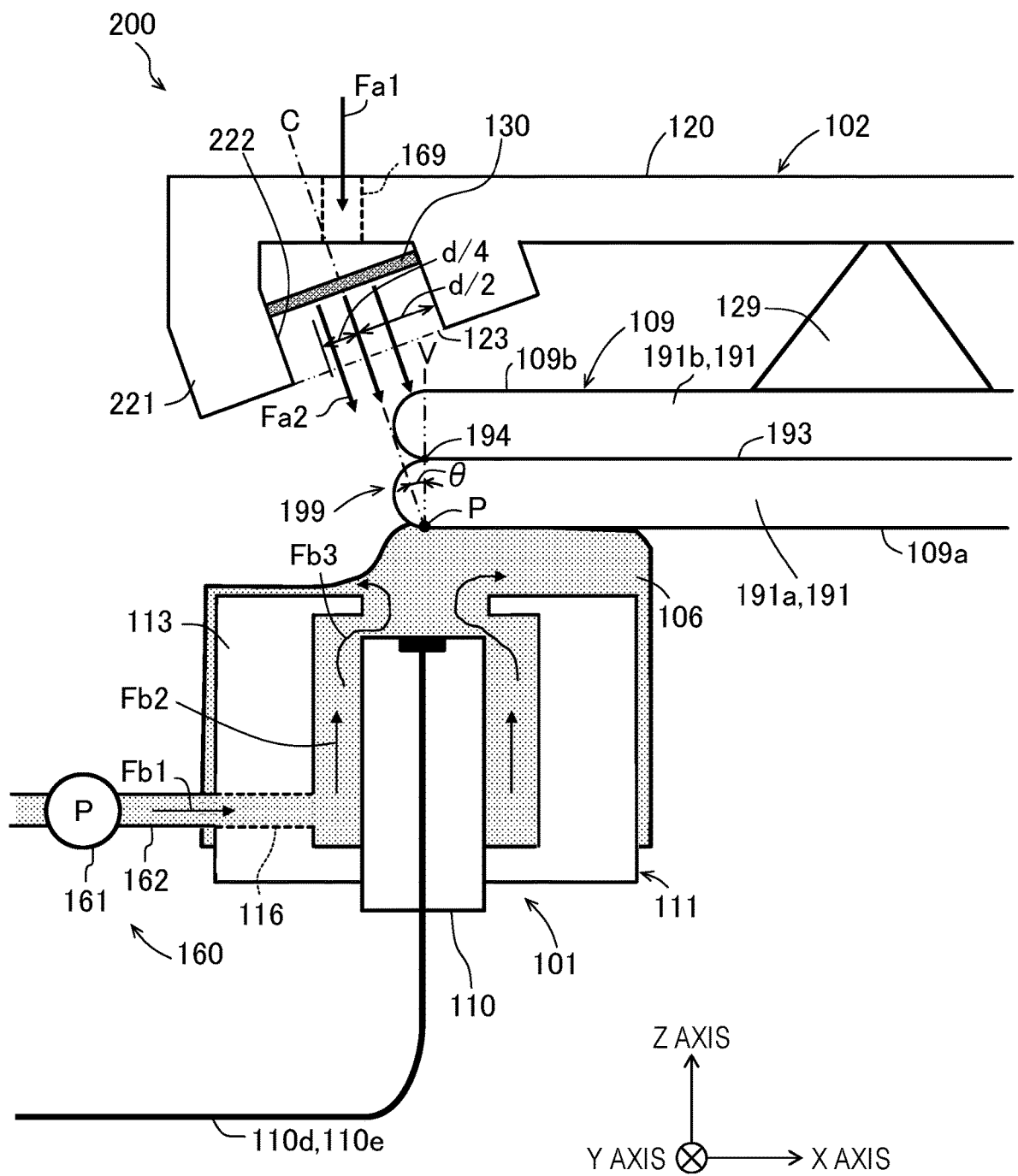
FIG. 6 is a diagram illustrating a shape of an air ejection unit of an ultrasound image apparatus according to a second embodiment.
Figure 7:
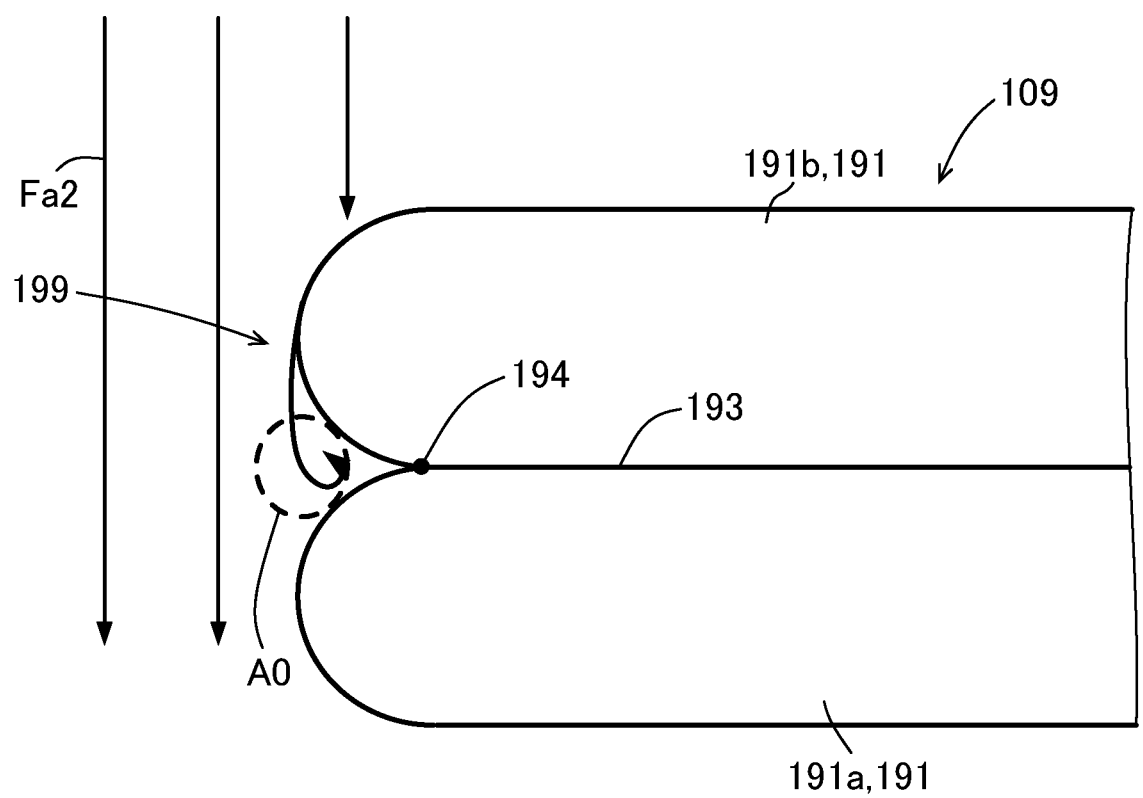
FIG. 7 is a schematic diagram of a flow of air ejected vertically downward from the air ejection unit in the vicinity of an outer peripheral end portion of a bonded wafer.

FIG. 6 is a diagram illustrating a shape of an air ejection unit 221 of the ultrasound image apparatus 200 according to the second embodiment. In the second embodiment, as illustrated in the drawing, an ejection opening portion 222 is formed such that a direction of air ejected from the ejection opening portion 222 of the air ejection unit 221 is inclined by an inclination angle $\theta$ with respect to a vertical axis V ($\theta>0$).

In the first embodiment, an example in which air is ejected vertically downward from the ejection opening portion 122 of the air ejection unit 121 has been described. However, as illustrated in FIG. 7, when each of the outer peripheral end portions of the wafer 191 constituting the bonded wafer 109 is chamfered, there is a possibility that a portion where no airflow is applied is formed in a part of the outer peripheral end portion 199 of the bonded wafer 109. In this case, a vortex flow is generated in the vicinity of the outer peripheral end edge 194 of the bonded surface 193 of the bonded wafer 109, and a negative pressure region A0 is formed. As a result, a part of the liquid film 106 is sucked up by the negative pressure region A0, and water may infiltrate into the bonded surface 193.

Therefore, in the second embodiment, as illustrated in FIG. 6, in order to prevent the negative pressure region A0 from being formed between the outer peripheral end portions of the uppermost layer wafer 191b and the lowermost layer wafer 191a bonded to each other, air is obliquely applied between the outer peripheral end portions of the uppermost layer wafer 191b and the lowermost layer wafer 191a.

In the present embodiment, the ejection opening portion 222 is formed such that the radial central axis C of the ejection opening portion 222 of the air ejection unit 221 passes through an intersection P between the vertical axis V passing through the outer peripheral end edge 194 (portion where chamfering starts) of the bonded surface 193 and the bottom surface 109a of the bonded wafer 109. That is, an outer peripheral surface and an inner peripheral surface of the ejection opening portion 222 are also inclined with respect to the vertical direction (normal direction of the bottom surface 109a of the bonded wafer 109) similarly to the radial central axis C of the ejection opening portion 222. The inclination angle $\theta$, which is an angle formed by the radial central axis C of the ejection opening portion 222 and the vertical axis V, is preferably set to a most suitable angle by a numerical fluid simulation or experiment. From the numerical fluid simulation and experiment, it was confirmed that generation of a vortex flow can be suppressed when the inclination angle θ is 10 degrees or more and 30 degrees or less.

In the positional relationship between the outer peripheral end portion 199 of the bonded wafer 109 and the ejection opening portion 222, slight positional deviation is allowed. The outer peripheral end edge 194 of the bonded surface 193 of the bonded wafer 109 preferably falls within a range of less than (d/2)×cos θ in the inner diameter direction from the position illustrated in FIG. 6 or a range of less than or equal to (d/4)×cos θ in the outer diameter direction from the position illustrated in FIG. 6.

In the second embodiment, in the scanning step S70, air is ejected from the ejection opening portion 222 of the air ejection unit 221 in a direction inclined with respect to the vertical axis V. According to the second embodiment, when each of the outer peripheral end portions of the wafers 191 constituting the bonded wafer 109 is chamfered, the negative pressure region A0 can be prevented from being formed between the outer peripheral end portions of the wafers 191 bonded to each other. Therefore, according to the second embodiment, when the outer peripheral end portion of the wafer 191 is chamfered, it is possible to appropriately prevent water from infiltrating into the bonded surface 193 of the bonded wafer 109.

The following modifications are also within the scope of the present invention, and it is also possible to combine the configuration illustrated in the modification with the configuration described in the above-described embodiment, combine the configurations described in the above-described different embodiments, or combine the configurations described in the following different modifications.

Modification 1

In the above embodiments, an example in which the rectifying unit 130 provided in the air ejection unit 121 is a filter made of a porous body has been described, but the present invention is not limited thereto. Hereinafter, modifications of the rectifying unit provided in the air ejection unit will be described.

Modification 1-1

Figure 8:
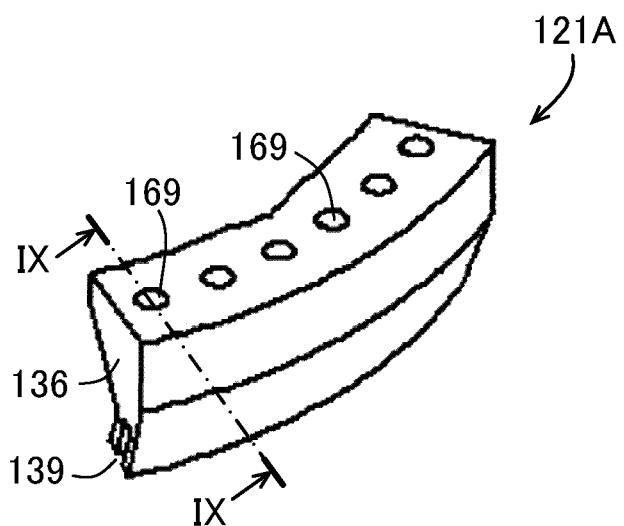
FIG. 8 is a perspective view illustrating a part of an air ejection unit according to Modification 1-1.
Figure 9:
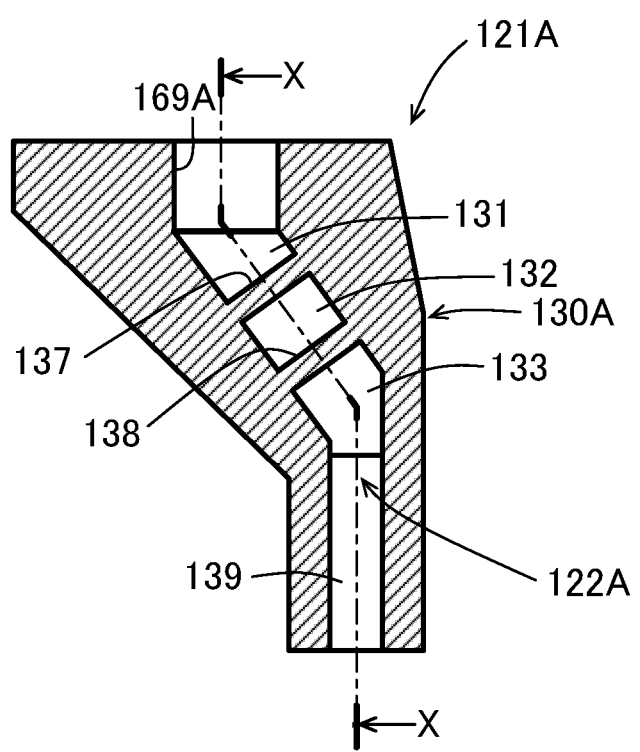
FIG. 9 is a schematic cross-sectional view taken along line IX-IX of FIG. 8.
Figure 10:
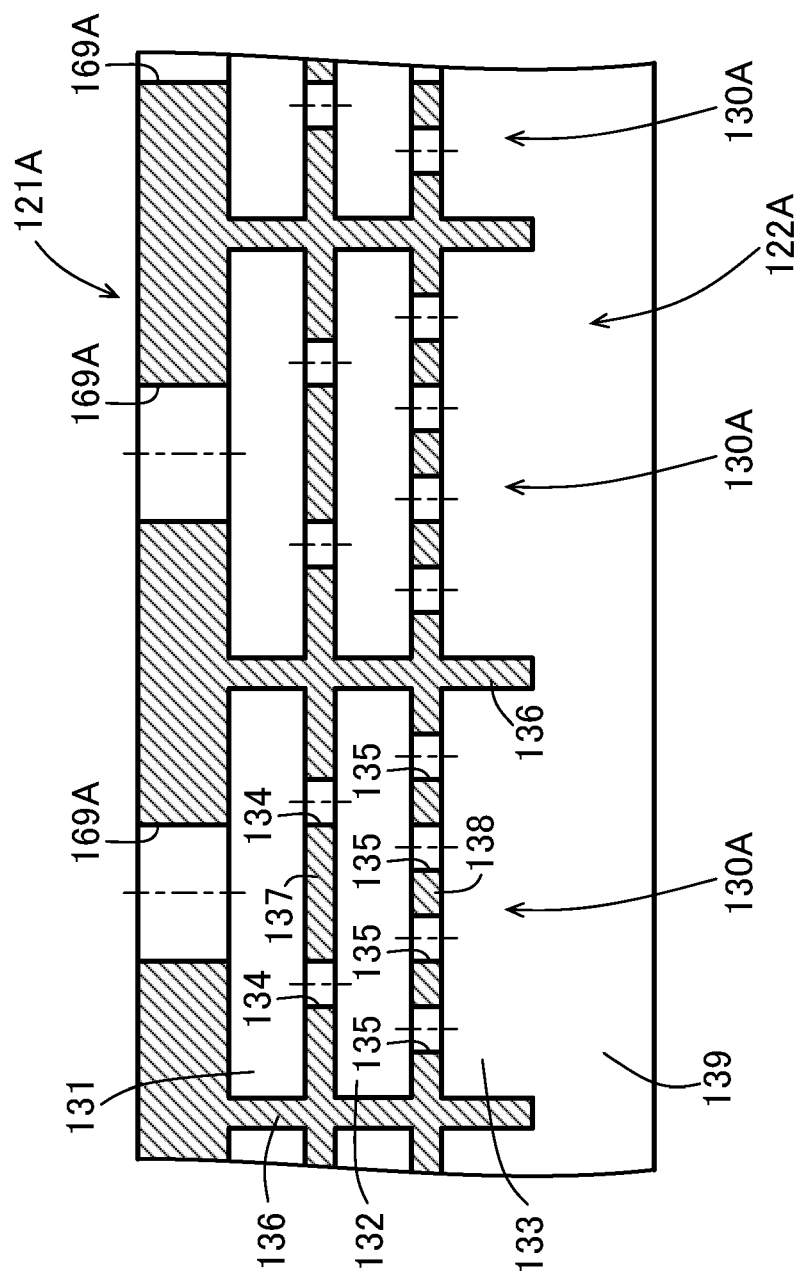
FIG. 10 is a schematic cross-sectional view taken along line X-X of FIG. 9.

FIG. 8 is a perspective view illustrating a part of an air ejection unit 121A according to Modification 1-1, FIG. 9 is a schematic cross-sectional view taken along line IX-IX of FIG. 8, and FIG. 10 is a schematic cross-sectional view taken along line X-X of FIG. 9. FIG. 10 is a schematic cross-sectional view taken along a flow path of the ejection opening portion 122A illustrated in FIG. 9.

As illustrated in FIGS. 8 to 10, in the present Modification 1-1, a plurality of rectifying units 130A are provided in the ejection opening portion 122A. The plurality of rectifying units 130A are provided at equal intervals along the circumferential direction of the air ejection unit 121A. A vertical plate 136 that separates the adjacent rectifying units 130A is formed between the adjacent rectifying units 130A. The rectifying unit 130A includes a first air chamber 131, a second air chamber 132, and a third air chamber 133 from the upstream side toward the downstream side of the air.

The first air chamber 131 communicates with the air intake unit 169A on the upstream side. Two through holes 134 are formed in a horizontal plate 137 that separates the first air chamber 131 and the second air chamber 132. The first air chamber 131 communicates with the second air chamber 132 via the two through holes 134 on the downstream side. Four through holes 135 are formed in a horizontal plate 138 that separates the second air chamber 132 and the third air chamber 133. The second air chamber 132 communicates with the third air chamber 133 via the four through holes 135 on the downstream side. The third air chamber 133 communicates with an outlet portion 139 of the ejection opening portion 122A on the downstream side.

As described above, the rectifying unit 130A according to the present modification has a configuration in which the horizontal plates 137 and 138 in which the circular through holes 134 and 135 are formed are provided in a plurality of stages, and the number of through holes increases toward the outlet portion 139 of the ejection opening portion 122A. The plurality of through holes 134 and 135 provided in the plurality of stages of horizontal plates 137 and 138 have the same opening area. The through holes 134 and 135 provided in the horizontal plates 137 and 138 of the respective stages are arranged with their central axes shifted from each other.

As illustrated in FIG. 10, for example, the through holes 134 and 135 are arranged so that the through holes 134 provided in the preceding horizontal plate 137 cannot be seen from the through holes 135 provided in the subsequent horizontal plate 138, and are arranged in line symmetry with an axis that divides the lengths of the horizontal plate 137 and 138 in the longitudinal direction into two equal parts and is parallel to the lateral direction of the horizontal plates 137 and 138 as a symmetry axis. Although FIGS. 9 and 10 illustrate an example in which three air chambers are provided in the ejection opening portion 122A, the number of air chambers may be four or more. In this case, the number of through holes communicating with the air chamber from the upstream side to the downstream side is preferably larger toward the downstream side.

According to such a modification, it is possible to eject the air taken in from the air intake unit 169A from the entire region of the annular ejection opening portion 122A in a plan view at a uniform ejection pressure without providing the filter made of the porous body described in the first embodiment.

Modification 1-2

The rectifying unit may have a crank-shaped flow path between the air intake unit 169A and the outlet portion 139 of the ejection opening portion 122A. In this configuration, the downstream side to the upstream side of the flow path bent in the crank shape of each stage cannot be seen. For example, the rectifying unit can be configured such that the air taken in from the air intake unit 169A and flowing vertically downward is changed in a direction of 90 degrees in the outer diameter direction by a crank-shaped flow path, then changed in a direction of 90 degrees in the vertical downward direction, then changed in a direction of 90 degrees in the inner diameter direction, then changed in a direction of 90 degrees in the vertical downward direction, and guided to the outlet portion 139 of the ejection opening portion 122A.

Modification 1-3

The rectifying unit may have the characteristics of the rectifying unit described in Modification 1-1 and Modification 1-2. That is, the horizontal plate in which the through hole is formed in the middle of the crank-shaped flow path of the rectifying unit described in Modification 1-2 may be provided in a plurality of stages in the air flow direction. The number of through holes provided in the horizontal plate increases toward the downstream side.

Modification 2

In the above embodiments, an example has been described in which the bonded wafer 109 has a configuration in which the disk-shaped wafers 191 are bonded in layers, but the present invention is not limited thereto. The bonded wafer 109 may have a configuration in which rectangular wafers 191 are bonded in layers.

Modification 3

In the above embodiments, an example in which the bonded wafer 109 includes two wafers 191 has been described, but the present invention is not limited thereto. The bonded wafer 109 may have a configuration in which three or more wafers 191 are bonded in layers.

Modification 4

In the above embodiments, the example in which the gas ejected from the gas ejection unit (air ejection units 121 and 221) is air has been described, but the gas ejection unit may eject gas (for example, nitrogen) other than air. By using air, the inspection can be performed at a lower cost than in the case of using other gases.

Modification 5

In the above embodiments, the example in which the X-axis scanner 152x, the Y-axis scanner 152y, and the Z-axis scanner 152z move the probe unit 101 has been described, but the present invention is not limited thereto. The X-axis scanner 152x, the Y-axis scanner 152y, and the Z-axis scanner 152z may be configured to move one of the probe unit 101 and the holding device 102, respectively. For example, the X-axis scanner 152x and the Z-axis scanner 152z may move the probe unit 101, and the Y-axis scanner 152y may move the holding device 102.

Although the embodiment of the present invention has been described above, the above embodiments merely illustrate a part of the application example of the present invention, and the technical scope of the present invention is not intended to be limited to the specific configurations of the above embodiments. In each embodiment, control lines and information lines considered to be necessary for description are illustrated, and not all the control lines and information lines on a product are necessarily illustrated. In practice, it may be considered that almost all the configurations are connected to each other.

What is claimed is:

1. An ultrasound image apparatus that irradiates a bonded wafer in which two or more wafers are bonded with an ultrasonic wave and acquires a reflected wave of the ultrasonic wave to generate an image of a bonded surface between the wafers, the ultrasound image apparatus comprising:

an ultrasonic probe that irradiates the bonded wafer with the ultrasonic wave while moving along a bottom surface on a lower side of the bottom surface of the bonded wafer and acquires a reflected wave of the ultrasonic wave;

a liquid ejection unit that moves together with the ultrasonic probe while continuously ejecting a liquid that propagates the ultrasonic wave toward the bottom surface such that a liquid film in contact with the bottom surface is formed between the liquid ejection unit and the bottom surface of the bonded wafer; and a gas ejection device that ejects gas, wherein the gas ejection device includes a gas ejection unit that ejects gas for pushing down the liquid toward an outer peripheral end portion of the bonded wafer so that the liquid ejected from the liquid ejection unit does not infiltrate into the bonded surface from the outer peripheral end portion of the bonded wafer.

2. The ultrasound image apparatus according to claim 1, further comprising a liquid supply device that supplies liquid to the liquid ejection unit such that the liquid film formed on an upper surface of the liquid ejection unit is maintained at a constant thickness.

3. The ultrasound image apparatus according to claim 1, wherein the gas ejection unit includes a plurality of gas intake units that take in gas, an ejection opening portion that communicates with the plurality of gas intake units and ejects the gas taken in from the plurality of gas intake units toward the outer peripheral end portion of the bonded wafer, and a rectifying unit that is provided in the ejection opening portion and rectifies the gas taken in from the plurality of gas intake units, the ejection opening portion is formed in an annular shape along the outer peripheral end portion above the outer peripheral end portion of the bonded wafer, and the rectifying unit is provided over an entire region of the ejection opening portion.

4. The ultrasound image apparatus according to claim 1, wherein the gas ejection unit is formed such that a direction of gas ejected from the gas ejection unit is inclined with respect to a vertical axis.

5. The ultrasound image apparatus according to claim 1, wherein the gas ejection device includes a holding unit that horizontally holds the bonded wafer, and the holding unit holds the bonded wafer such that a distance from an upper surface of the liquid ejection unit to the bottom surface of the bonded wafer is maintained at a predetermined separation distance.

6. A liquid infiltration prevention method for preventing liquid from infiltrating into a bonded surface from an outer peripheral end portion of a bonded wafer when a liquid that propagates an ultrasonic wave is supplied between a bottom surface of the bonded wafer in which two or more wafers are bonded and an ultrasonic probe and the bonded wafer is irradiated with the ultrasonic wave from the ultrasonic probe to generate an image of the bonded surface between the wafers, the method comprising:

a positioning step of positioning a gas ejection unit that ejects gas and the bonded wafer;

a wafer holding step of holding the positioned bonded wafer by a holding unit;

a probe arrangement step of arranging the ultrasonic probe on a lower side of the bottom surface of the bonded wafer held by the holding unit;

a liquid supply step of supplying a liquid to a case accommodating the ultrasonic probe, filling a space between the ultrasonic probe and the bottom surface of the bonded wafer with the liquid, and forming a liquid film in contact with the bonded wafer on an upper surface of the case; and a scanning step of scanning the ultrasonic probe along the bottom surface together with the case while continuously ejecting liquid from a liquid outlet portion formed on the upper surface of the case such that the liquid film formed on the upper surface of the case is in contact with the bottom surface of the bonded wafer, wherein in the scanning step, when the ultrasonic probe is located below the outer peripheral end portion of the bonded wafer, gas is ejected from the gas ejection unit toward the outer peripheral end portion so that liquid ejected from the case does not infiltrate into the bonded surface from the outer peripheral end portion of the bonded wafer, and the liquid ejected from the case is pushed down by the gas ejected from the gas ejection unit.

7. The liquid infiltration prevention method according to claim 6, wherein in the scanning step, gas is ejected from the gas ejection unit in a direction inclined with respect to a vertical axis.

* * * * *